United States Patent [19]

Sokolow

[11] 4,176,152
[45] Nov. 27, 1979

[54] HEATING AND STRATIFICATION METHOD FOR AN INJECTION MOLDING MACHINE

[75] Inventor: Nickolas N. Sokolow, Cheshire, Mass.

[73] Assignee: Beloit Corporation, Beloit, Wis.

[21] Appl. No.: 856,306

[22] Filed: Dec. 1, 1977

Related U.S. Application Data

[60] Continuation-in-part of Ser. No. 738,460, Nov. 3, 1976, abandoned, which is a division of Ser. No. 635,791, Nov. 28, 1975, Pat. No. 4,015,916.

[51] Int. Cl.$^2$ .............................................. B29F 1/12
[52] U.S. Cl. ..................................... 264/329; 264/75; 264/77
[58] Field of Search ...................... 264/73, 77, 329, 75

[56] References Cited

U.S. PATENT DOCUMENTS

| | | | |
|---|---|---|---|
| 2,740,160 | 3/1956 | McKee | 259/185 |
| 2,919,469 | 1/1960 | Wheeler | 425/207 |
| 3,281,899 | 11/1966 | Dacco | 264/329 |
| 3,716,612 | 2/1973 | Schrenk | 264/329 |
| 4,042,660 | 8/1977 | Bishop | 264/77 |

*Primary Examiner*—Paul R. Michl
*Attorney, Agent, or Firm*—Dirk J. Veneman; Michael L. Gill; Gerald A. Mathews

[57] ABSTRACT

An injection molding machine having a barrel and a reciprocating and rotatable screw disposed therein. A combination heat transfer and stratification device is disposed between the screw and the outlet of the barrel. The device includes a generally tubular portion having radially outwardly extending ribs. The ribs are in contact with the inner wall of the barrel. Heating means supply heat to the portion of the barrel containing the device and heat is transmitted through the rib portions. A process is disclosed whereby plastic is partially melted in the screw section and then stratified for final melting and thereby reduces mixing to provide a mottled appearance or plastic parts containing long fine filaments such as fine wires.

5 Claims, 6 Drawing Figures

HEATING AND STRATIFICATION METHOD FOR AN INJECTION MOLDING MACHINE

BACKGROUND OF THE INVENTION

This application is a continuation-in-part of my copending application, Ser. No. 738,460, filed on Nov. 3, 1976, now abandoned, which was a divisional of my prior application, Ser. No. 635,791, filed on Nov. 28, 1975, now U.S. Pat. No. 4,015,916.

The following relates to injection molding machines specifically adapted for plasticizing materials such as thermoplastic materials and the like, although it is adaptable to other materials capable of being formed in a like manner.

In the injection molding machine art, most machines are of the rotatable and reciprocating screw type. It has generally replaced the conventional "plunger" type of machine which consisted of a reciprocal plunger forcing plastic over a fixed torpedo near the outlet portion of the machine which material was injected into a mold.

A limitation of the reciprocating screw type machine is obtaining a mottled or marbleizing effect of injection molded items. The reciprocating screw is so efficient that when colorant is added to the plastic pellets, the resultant effect is a single homogeneous colored plastic article. Attempts to produce marbleizing on the reciprocating screw without major modifications thereto have not been successful. In fact, it is common today to still use the old plunger type machines to produce marbleized items. This results in a substantially slower cycle time and inefficient utilization of the more modern and highly efficient reciprocating screws.

A separate problem associated with conventional reciprocating screw type injection molding machines is that the cycle is substantially fast. The screw moves back into the cylinder, subjecting the plastic pellets to plasticization over a shorter length of the screw, thereby not as effectively melting the plastic. In some instances, the screw rotational speed must be reduced and the machine cycle must be substantially increased to insure that the plastic will be thoroughly plasticized before injection.

Also, it has recently become desirable to provide injection molded parts which are filled with relatively long fine filaments, such as fine wire. The long, rigorous mixing time in prior art machines tends to break these filaments and thus reduce their effectiveness.

It would be desirable then to provide for a reciprocating screw type injection molding machine means to produce marbleized parts and parts with fine elongated filaments such as wire. It further would be desirable to decrease the cycle time for a reciprocating screw injection molding machine.

SUMMARY OF THE INVENTION

An injection molding machine having a barrel and a reciprocal and rotatable screw disposed therein. A combination heat transfer and stratification device is disposed between the screw and the outlet of the barrel. This section includes a generally tubular portion having radially inwardly extending ribs which contact the inner wall of the cylinder and project towards the center of the barrel. Heating means supply heat to at least that portion of the cylinder containing the heat transfer and stratification device so that the tubular barrel section conducts the heat from the barrel through the ribs. This portion of the barrel with heat transferring device therein, functions in the same manner as the cylinder of a plunger type machine. The melting of material is completed by heat conduction with practically no motion or intermixing which is normally associated with melting by screw rotation.

The heat transfer and stratification device is generally composed of a cylindrical section having a plurality of flow passageways defined therethrough and extending in a general parallel relationship to the barrel. The melt flow from the screw passes through these passageways to the outlet of the barrel. The radially extending ribs prevent intermixing of the stratified melt layers or breakage of fine filaments or wires which may be included in the plastic. The fins also conduct the heat from the barrel radially inwardly towards the center of the barrel, thereby heating the melt throughout the entire cross-sectional area of the barrel.

DESCRIPTION OF THE PREFERRED EMBODIMENT

Figure 1:
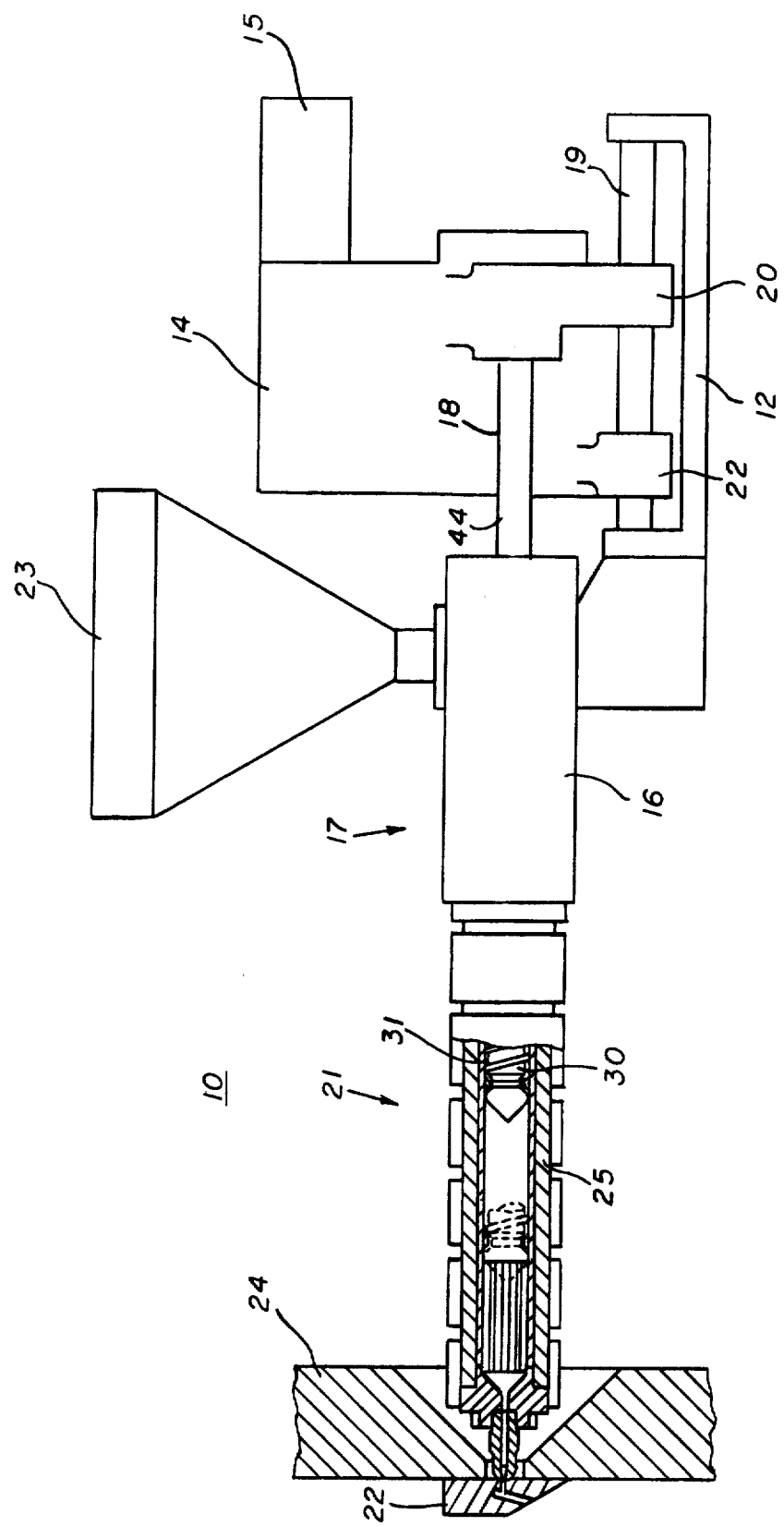
FIG. 1 is a side elevational view partly in section of an injection molding machine having a heating and stratification device built in accordance with the principles of the present invention.

Referring to the drawings and more specifically to FIG. 1, there is shown a plasticizing and plastic delivering unit of an injection molding machine 10. The machine 10, as shown is highly diagrammatic, and well known and therefore will not be described in detail. Basically, the machine 10 is comprised of a main base portion 12 and a rotatable drive unit 14, driven by hydraulic motor 15. A pair of hydraulic cylinders 16, are disposed on each side of the machine, one on each side and only one cylinder being shown. The cylinder 16 comprises the longitudinal or axial drive unit 17. The rotating drive unit 14, the hydraulic motor 16, and the axial drive unit 17 are supported on the base 12. The axial drive unit 17 is attached in axial driving relation to the rotatable drive unit 14 via piston rods 18 at the shoulder support 20, only one rod 18 and support 20 being shown. The rotatable drive unit 14 is slidably supported on a pair of tie rods 19 through supports 20 and 22, only one of each being shown. A reciprocating screw unit 21 is cooperatively supported in a cantilevered manner by base 12, axial drive unit 17 and rotatable drive unit 14. A hopper structure 23 feeds plastic materials of different colors (e.g. solid color plastic and the addition of colored regrind or master-batch pellets) or plastic material with addition of concentrated colorant (e.g. chimney black pellets which are non-plastic) to the reciprocating screw unit 21 in a manner well known in the art.

The reciprocating screw unit 21 delivers material to the mold structure 22, only a portion being shown, through the fixed platen 24, and furthermore, plasticizes the material.

Figure 2:
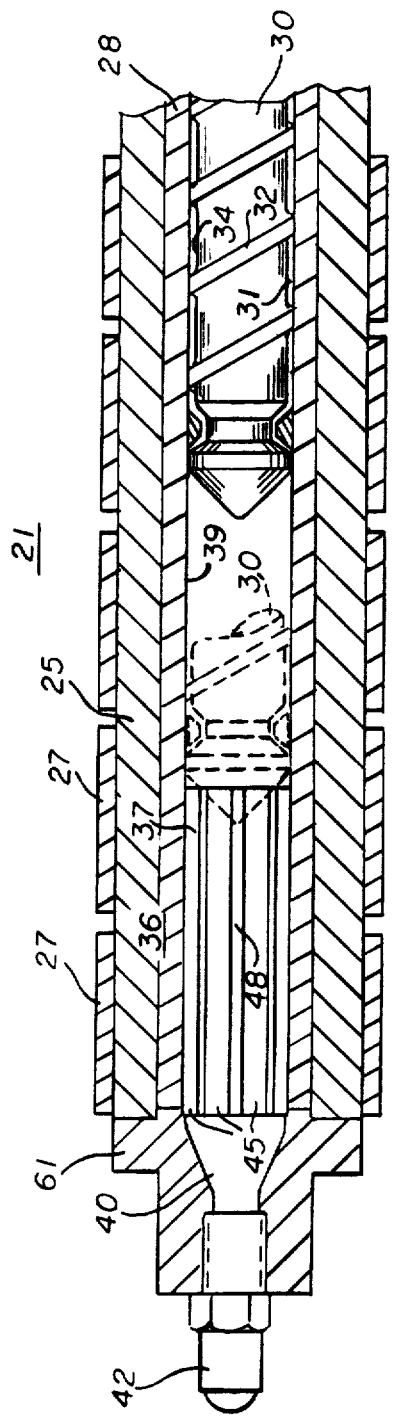
FIG. 2 is an axial sectional view of the heating and stratification device as shown in FIG. 1 on an enlarged scale.

As best seen in FIG. 2, the reciprocating screw unit 21 is comprised of a plastic material delivering cylinder or barrel 25. Encompasssing the barrel 25, is a plurality of heater bands 27 which may be of the electrical resistance type. Forming a portion of the barrel 25, is a cylindrical liner member 28, said member being secured to the inner diameter wall of the barrel. A reciprocating screw 30 is disposed within the liner 28, the screw being rotatable and axially reciprocal relative to the liner 28 and barrel 25. The screw 30 has a plurality of annular, flat surfaces 34 between the liner and the screw body which are partially defined by threads or flights 32. The threads or screw flights 32 are in frictional abutment with the inner diameter wall of the liner 28. The flat surfaces 34 are in a radially spaced relationship with the liner 24, thereby defining a continuous annular material delivering groove 31.

At the forward end or injection end of the screw unit 21 is static heating zone 36. The heating zone 36 encompasses a heat transfer and stratification device 37. The device 37 is in a tight frictional abutment with the inner wall 39 of the liner 28 of barrel 25, and remains stationary with respect thereto. Both ends of the device 37 are open, one end communicating with the outlet of the screw 30 and the other end communicating with the outlet flow passage 40 of the screw unit 21. A shutoff nozzle 42 may be disposed on the outlet end of the screw unit as is standard practice in the art. In certain embodiments, not shown, the injection end of the member 44 may have a torpedo end extending into passage 40 to reduce the quantity of plastic in the outlet passage.

Figure 3:
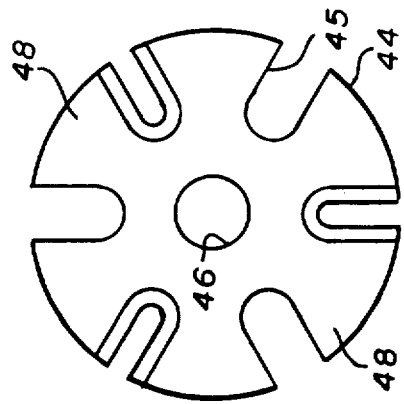
FIG. 3 is an end view of the heating and stratification device shown in FIG. 2 and on an enlarged scale.

Many different heat transfer stratification devices can be utilized in the static heating zone 36. A first embodiment, as shown in FIG. 3, comprises a general cylindrical member 44. The member 44 has a plurality of parallel flow passageways 45 defined therein. The flow passageways 45 extend radially inwardly from the outer circumferential portion of the member 44 radially inwardly towards the center of the member. A central passageway 46 is disposed centrally within the member 44. The passageways 45 are substantially defined by radially inwardly extending rib portions 48. The rib portions 48 are in frictional abutment with the inner wall 39. Preferably, the cylindrical member 44 is made from a good heat conducting material with a large coefficient of expansion, such as copper alloys or aluminum like chromium copper or beryllium copper.

In this manner, the member 44 can easily slide into the barrel 25, but upon heating will expand relative to the barrel and firmly engage the barrel in a manner to prevent member 44 from moving or rotating. On cooling, member 44 will contract and thus facilitate removal of the member. As best seen in FIG. 2, the passageways 45 are generally aligned in a parallel spaced relation with the barrel 25. The inlet and outlet portions are preferably tapered for streamlined plastic flow and the central passageway 46 is designed to be compatible with the forward end of the screw 30. Although not shown, the passgeways 45, 46 can be of a non-uniform decreasing section at its downstream end so that large color concentrates can be trapped and the melt flow will gradually concentrate in size.

Figure 4:
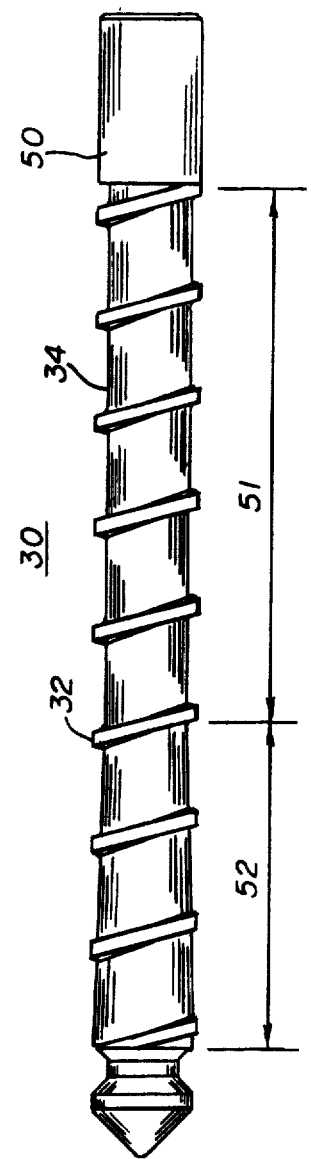
FIG. 4 is a side elevational view of a marbleizing screw.

The screw 30 is best seen in FIG. 4. This screw is specially modified for marbleizing application. It includes a shaft portion 50, a feed portion 51, and a compression portion 52. It will be appreciated that this screw does not have a metering portion commonly associated with plasticizing screws. It has a relatively short length to diameter (L/D) ratio of about 16 in contradistinction to a conventional molding screw having a length to diameter ratio of 20 or 24. By eliminating the metering portion of the screw and shortening the screw, plastic is partially plasticized by the screw and partially melted thereby. On the other hand, the plastic is not completely melted and is not totally intermixed and homogenized to produce a single colorant.

Furthermore, the screw preferably has a low compression ratio to prevent high shear mixing action. Preferably, the compression ratio would be approximately between 2:1 and 1:1.

DESCRIPTION OF THE SECOND EMBODIMENT

Figure 5:
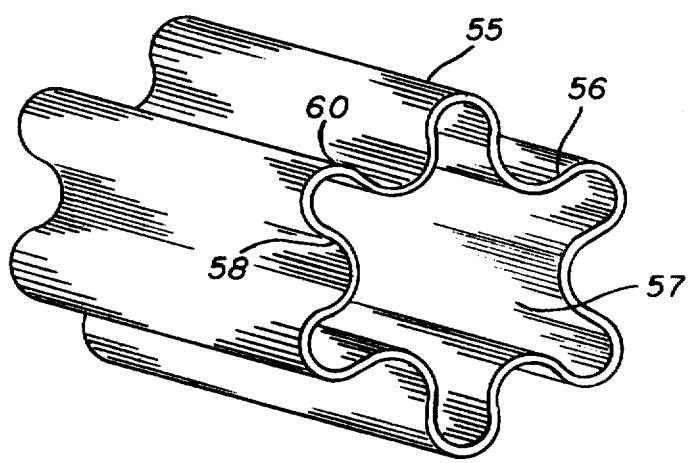
FIG. 5 is a perspective view of a second embodiment of the heat transfer and stratification device.

In the static heating zone 36 of the reciprocating screw unit 21, a second embodiment of the heat transfer and stratification device 54 is best shown in FIG. 5. The device 54 comprises a generally cylindrical member 55 having a plurality of plasticized flow passageways 56 defined therein. The flow passageways are generally "U" shaped in cross-sectional area. A central flow passageway 57 is defined within the central portion of the stratification device 54. The walls of the device define rib portions 58 extending radially inwardly from the outer portion of the device towards the radially inner portion of the device. The outermost portions 60 are generally arcuate shaped and conform to the inner circumferential wall of the barrel 25. The outermost portions 60 will be in close frictional heat transfer relation with the inner wall of the barrel.

The stratification device 54 can be formed by bending a good conducting material such as aluminum sheet around a mandrel to achieve this shape. The stratification device is snuggly inserted into the static heating zone 36 in a manner that the device will not rotate since thermal expansion of aluminum is about three times as great as steel. An aluminum device even with comparatively free fit when cold will be firmly wedged and cannot be moved or removed until cooled. The device 54 can be removed by first removing the most forward wall portion 61 of the reciprocating screw unit 21.

DESCRIPTION OF THE THIRD EMBODIMENT

Figure 6:
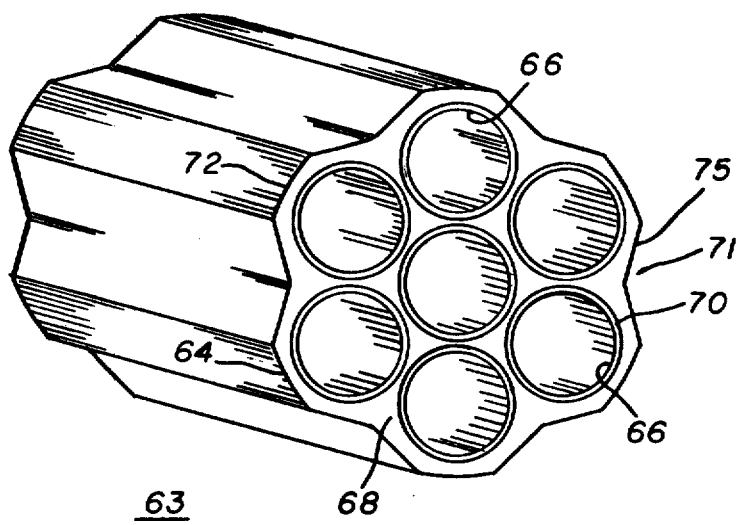
FIG. 6 is a perspective view of a third embodiment of a heat transfer and stratification device.

A third embodiment of the heat transfer and stratification device 63 is best shown in FIG. 6. The device 63 comprises a generally cylindrically shaped member 64. The member 64 has a plurality of plastic flow passageways 66 equally spaced in an annular array around the outer radial portion of the member 64. A central flow passageway 67 is defined around the radially central portion of the stratification device 63. The passageways are generally circular in section and are all approximately the same size.

The walls of the device 63 define rib portions 68 extending radially inward from the outer portion of the device towards the radially inner portion thereof. The passageways 66 preferably have tapered chamfered inlet portions 70 to minimize disturbance in the flow of the plasticized melt.

The radially outward portion of the cylindrical member 64 has preferably slightly curved wall members generally defining an arcuate portion 72. The arcuate portions 72 generally conform in size and shape to the inner wall portion 39 of the barrel 25.

An additional series of passageways 74 are defined between the indented outer peripheral wall portion 75 and the inner wall 39 of the barrel.

MARBLEIZING OPERATION

Plastic particles and colorant as previously defined are deposited in the hopper 23 (FIG. 1) of the injection molding machine 10. The combination is fed to the inlet section of the reciprocating screw unit 21. The screw 30 for marbleizing is that shown in FIG. 4 and comprises a feed section 51 and a compression section 52. Since the screw has a relatively short L/D ratio and a low compression ratio, the plastic material and the colorant are partially plasticized but not completely melted. As the screw 30 rotates, (FIG. 2), the screw will move back from the completely injected position, as shown by the dotted lines, to its fully retracted position. This volume of plastic between the inlet side of the heat transfer and stratification device 37 and the most forward portion of the screw 30 is defined as the "shot size", i.e. that amount of plastic that will be injected into the mold. This size is adjustable depending upon the distance the screw retracts and the length of the stratification device 54.

Once the shot size is established, and the screw moves to its retracted position, the screw 30 stops rotation and injects the shot into the static heating zone 36. The total volume of the static heating zone with the device 37 therein is slightly less than the volume of the one shot. The screw 30 is then rammed forward in the completely injected or forward position as that shown by the dotted lines in FIG. 2.

The shot in the static heating zone is stratified by the device 37 which can be any of the embodiments shown in FIGS. 3, 5, and 6. The colorant at this time is not thoroughly intermixed with the partially plasticized melt to form a homogeneous color. Instead, the colorant forms substantially stratified layers within the melt.

The heater bands 27 which are continuously on during this injection molding cycle, conduct heat throught the barrel 25 and the liner 28, to the heat transfer and stratification device 37. The heat is conducted from the liner member through the radially extending ribs 48 to distribute the heat from the outer portions of the cylindrical member 44 down into the central portions of the cylinder. While the screw 30 is rotating and reciprocating backwards to prepare the next shot, the melt is plasticized in the static heating zone 36 to its final melted state without any additional mixing. During the next stroke of the screw 30, the plastic is pushed out of the static heating zone 36 by the next partially melted shot.

The stratified layers of plasticized melt and colorant leaving the static heating zone 36 recombines in the exit portion 41 of the reciprocating screw unit 21. As it passes through the nozzle 42 through the fixed platen 24 (FIG. 1) into the mold 22, the turbulent and frictional agitation causes a partial mixing and blending of the colorant and completely plasticized melt. The resultant effect is a marbleized or mottled part produced on a standard reciprocating type injection molding machine.

INCREASED VOLUME OPERATION

By utilizing an injection molding machine with a longer barrel to accommodate the heat transfer and stratification device or adding a section (not shown) to a conventional injection molding barrel containing the heat transfer and stratification device, a decrease in the injection molding cycle can be achieved by means of this invention. Utilizing a standard screw 30 in the screw unit 21 in FIG. 1, the material is plasticized by the standard screw having a feed section, a compression section, and a metering section. However, because of the increased rotational speed, some material may not be completely melted by the screw. The plastic shot in the static heating zone 36, by utilization of the heat transfer and stratification device 37, will transmit the heat into the plasticized melt and allow the plastic to absorb additional heat for the duration of the injection cycle. Any material not completely melted by the screw is then conditioned and completely melted in the heating zone 36. This then has the effect of giving the proper melt quality, i.e. uniform melting of the plastic, within a shorter machine cycle.

What is disclosed then is an apparatus and method for utilizing existing reciprocating screw type molding machines, which can be converted to a machine capable of forming marbleized parts. Simply by using a shortened "marbleized" screw and a heat transfer and stratification device, the conversion can be made by a molder at his plant. The changeover is quick and almost without any loss of production time. All items can be manufactured independent of the machine so there is no additional loss of the machine time. An increase in efficiency in forming marbleized parts can be achieved.

The method and apparatus may also be used to advantage if it is desired to provide a plastic part with long fine fibers which normally would break up in a standard injection molding machine. An example would be fine wires to make the plastic electraconductive or to improve heat transfer properties. The filaments or fine wires are added at hopper 23 with the plastic. The plastic is heated and partially plasticized in the feed and compression portions 51 and 52. The plastic and wires then pass into a plurality of stratified zones or paths 45 for final melting of the plastic. This process, therefore, substantially reduces the bending and mechanical forces exerted on the fibers and thereby reduces the tendency for breakage of the fibers.

Furthermore, using a standard injection molding screw with the heat transfer and stratification device, can produce a decrease in cycle time without any additional loss of part quality. Again, the conversion can be done without almost any loss of production time and the conversion is relatively low in cost.

While more than one embodiment of the present invention is disclosed, it will be obvious to those skilled in the art that many modifications can be made within the spirit and scope of the invention.

What is claimed is:

1. A method of forming a plastic article in an injection molding machine of the type having a screw that reciprocates and rotates in a barrel said method comprising the steps of:
   (1) Introducing unmelted plastic material into the injection molding machine;
   (2) partially and incompletely plasticizing said material by the rotary action of the screw;
   (3) prior to complete plasticization of the plastic material, stratifying said material by moving the plastic material from the rotary screw to a heating zone comprising a plurality of elongated stratified passageways which extend substantially continuously for the entire length of said heating zone;

(4) heating said material in said stratified passageways by conduction to totally plasticize the plastic material without mixing; and (5) injecting the plasticized material into a closed mold.

2. The method as claimed in claim 1 including introducing a plurality of different colored plastic material into said machine to thereby provide a plastic article having a mottled appearance.

3. The method as claimed in claim 2 further including forcing the plasticized material into the mold with a partially and incompletely plasticized material.

4. The method as claimed in claim 1 further including providing elongated fine filaments in said injection molding machine along with said plastic material.

5. The method as claimed in claim 4 wherein said elongated fine filaments comprise fine wire elements.

* * * * *